United States Patent
Groat et al.

(10) Patent No.: US 9,446,778 B2
(45) Date of Patent: Sep. 20, 2016

(54) START-ASSIST PEDAL FOR TRANSPORT DOLLY

(71) Applicant: Toyota Motor Engineering & Manufacturing North America, Inc., Erlanger, KY (US)

(72) Inventors: Ross Groat, Delhi (CA); Wade Panton, Brantford (CA); Judy Simpson, Paris (CA); Bradley Simpson, Rodney (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/463,802

(22) Filed: Aug. 20, 2014

(65) Prior Publication Data

US 2016/0052535 A1    Feb. 25, 2016

(51) Int. Cl.
  *B62B 3/00*  (2006.01)
  *B62B 5/00*  (2006.01)

(52) U.S. Cl.
  CPC ............. *B62B 5/0026* (2013.01); *B62B 3/005* (2013.01); *B62B 3/008* (2013.01)

(58) Field of Classification Search
  CPC ..... B62B 5/0026; B62B 5/00; B62B 5/0083; B62B 5/0086; B62B 5/0093; B62B 5/0433; B62B 3/00; B62B 3/008; B62B 2203/05; B66F 15/00
  See application file for complete search history.

(56) References Cited

U.S. PATENT DOCUMENTS

| | | | | |
|---|---|---|---|---|
| 1,513,863 A * | 11/1924 | Sabin | ............................ | 414/456 |
| 1,956,261 A * | 4/1934 | Wagner | ........................ | 280/651 |
| 2,812,951 A * | 11/1957 | Hanson | ........................... | 280/46 |
| 3,648,869 A * | 3/1972 | Christianson | ............ | B60P 3/00 |
| | | | | 280/149.2 |
| 4,417,738 A * | 11/1983 | Kendall | ..................... | 280/43.17 |
| 5,727,284 A * | 3/1998 | Deutsch | ........................... | 16/30 |
| 5,758,888 A * | 6/1998 | Burgan | ................. | B62B 5/0083 |
| | | | | 220/908 |
| 5,785,293 A * | 7/1998 | Ford et al. | ..................... | 248/649 |
| 6,386,560 B2 * | 5/2002 | Calender | .................... | 280/47.34 |
| 6,598,247 B1 * | 7/2003 | Heimbrock et al. | ............. | 5/86.1 |
| 6,910,710 B2 * | 6/2005 | Nguyen | ........................ | 280/651 |
| 6,997,466 B2 * | 2/2006 | Wang | ......................... | 280/43.17 |
| 7,735,587 B1 * | 6/2010 | Stahlnecker | .............. | B62B 1/12 |
| | | | | 180/11 |
| 8,235,401 B1 | 8/2012 | Scriven et al. | | |
| 8,628,059 B2 * | 1/2014 | Hetrick et al. | ................ | 254/8 R |
| 8,973,927 B2 * | 3/2015 | Belanger | ...................... | 280/47.2 |
| 2002/0043776 A1* | 4/2002 | Chuang | ...................... | 280/43.24 |
| 2013/0119623 A1 | 5/2013 | Sadeh et al. | | |
| 2013/0119624 A1 | 5/2013 | Stubbs | | |

OTHER PUBLICATIONS

Japanese Diagram, Undated, in 1 page.

* cited by examiner

*Primary Examiner* — James M Dolak
(74) *Attorney, Agent, or Firm* — Christopher G. Darrow; Darrow Mustafa PC

(57) ABSTRACT

Disclosed herein is a design for a start-assist pedal assembly typically used for a cart or dolly that includes a pedal mounted to a support arm. An arched foot arm is pivotally attached to the support arm and a roller is supported by the arched foot arm.

15 Claims, 9 Drawing Sheets

START-ASSIST PEDAL FOR TRANSPORT DOLLY

BACKGROUND

The present disclosure relates to a dolly, and more particularly, to a start-assist pedal that facilitates a reduced initial push force.

Various work routines often require that tools and materials be transported manually. Oftentimes, a dolly is utilized to facilitate such transport. The dolly is typically of significant weight and may be particularly difficult to move from a stopped position.

The force required to initiate movement from the stopped position is often referred to as an initial push force, while the force required to maintain movement is referred to as a sustained push force. The initial push force is typically greater than the sustained push force, thus it is beneficial to reduce the initial push force.

SUMMARY

The start-assist pedal assembly described herein can be used to initiate movement of a dolly. The start-assist pedal assembly reduces initial push force to about 0 kg. The start-assist pedal assembly returns to a home position upon depression, utilizes a roller to eliminate drag, and facilitates continuous momentum of the dolly.

A start-assist pedal assembly includes a pedal mounted to a support arm, an arched foot arm pivotally attached to the support arm, and a roller supported by the arched foot arm.

Disclosed herein is a method of initiating movement of a dolly or cart by translating a force applied to a pedal into a force upon the dolly as an arched foot arm reacts upon the ground; and rolling a roller supported by the arched foot arm upon the ground upon full depression of the pedal.

The foregoing features and elements may be combined in various combinations without exclusivity, unless expressly indicated otherwise. These features and elements as well as the operation thereof, will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A start-assist pedal assembly to initiate movement of a dolly is disclosed. The start-assist pedal assembly reduces the initial push force required to start movement from a static position and facilitates dolly momentum.

Figure 1:
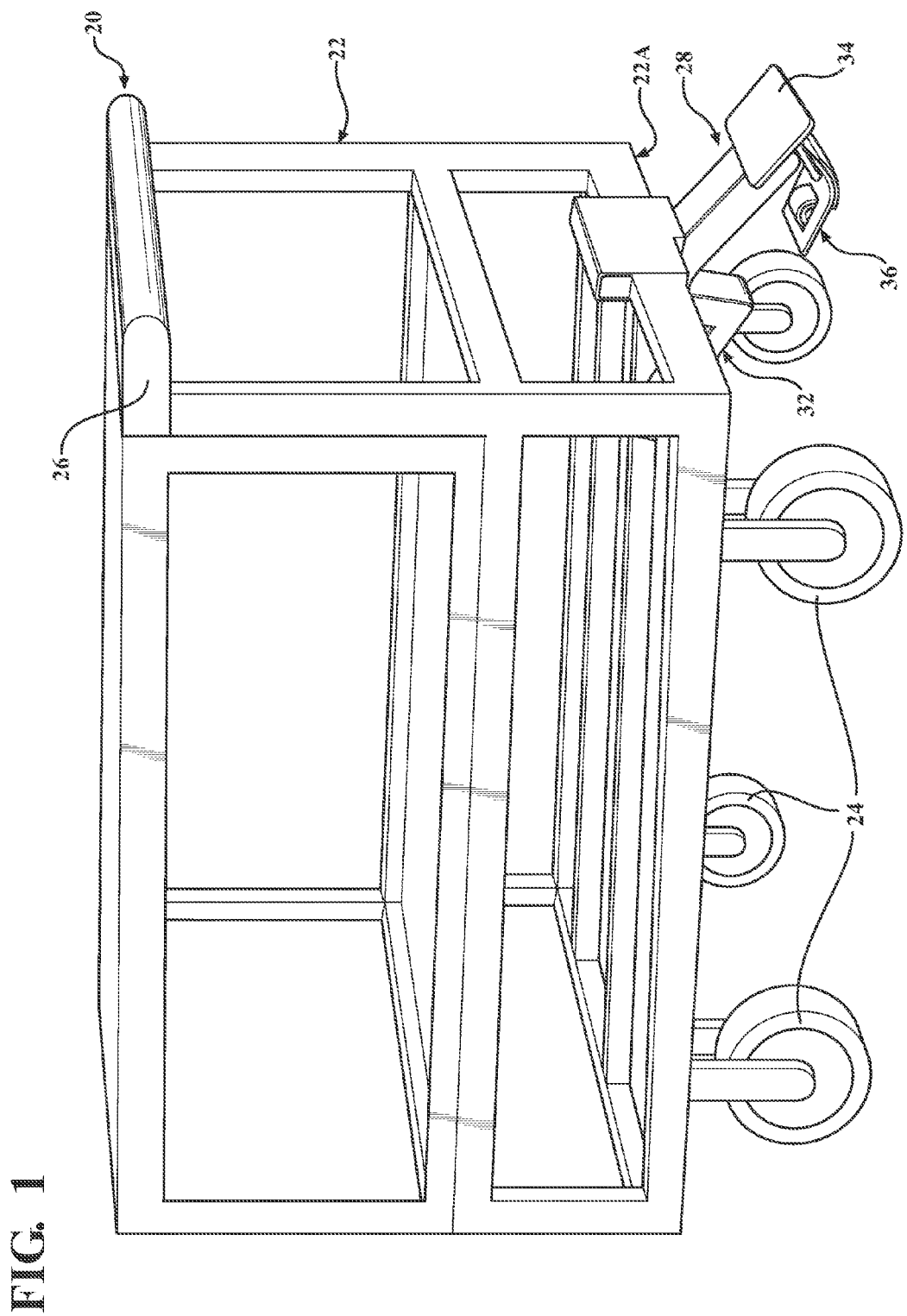
FIG. 1 is a schematic perspective view of a dolly with a start-assist pedal assembly.

FIG. 1 schematically illustrates a dolly 20 operable to transport a load via human applied motive forces. Although the dolly 20 is of a particular geometry in the disclosed, non-limiting embodiment, it should be appreciated that various architectures will also benefit herefrom.

The dolly 20 generally includes a body 22, a multiple of casters 24, a handle 26, and a start-assist pedal assembly 28. The body 22 may support significant weight that, in one example, may be on the order of 1500 lbs. (680 kg). The casters 24 may be manufactured of an alloy material or non-alloy material, and may be mounted on a swivel to facilitate movement of the dolly 20 via the handle 26. The start-assist pedal assembly 28 is mounted to an underside 22A of the body 22, and on a side common to the handle 26 to provide simultaneous access to both.

Figure 2:
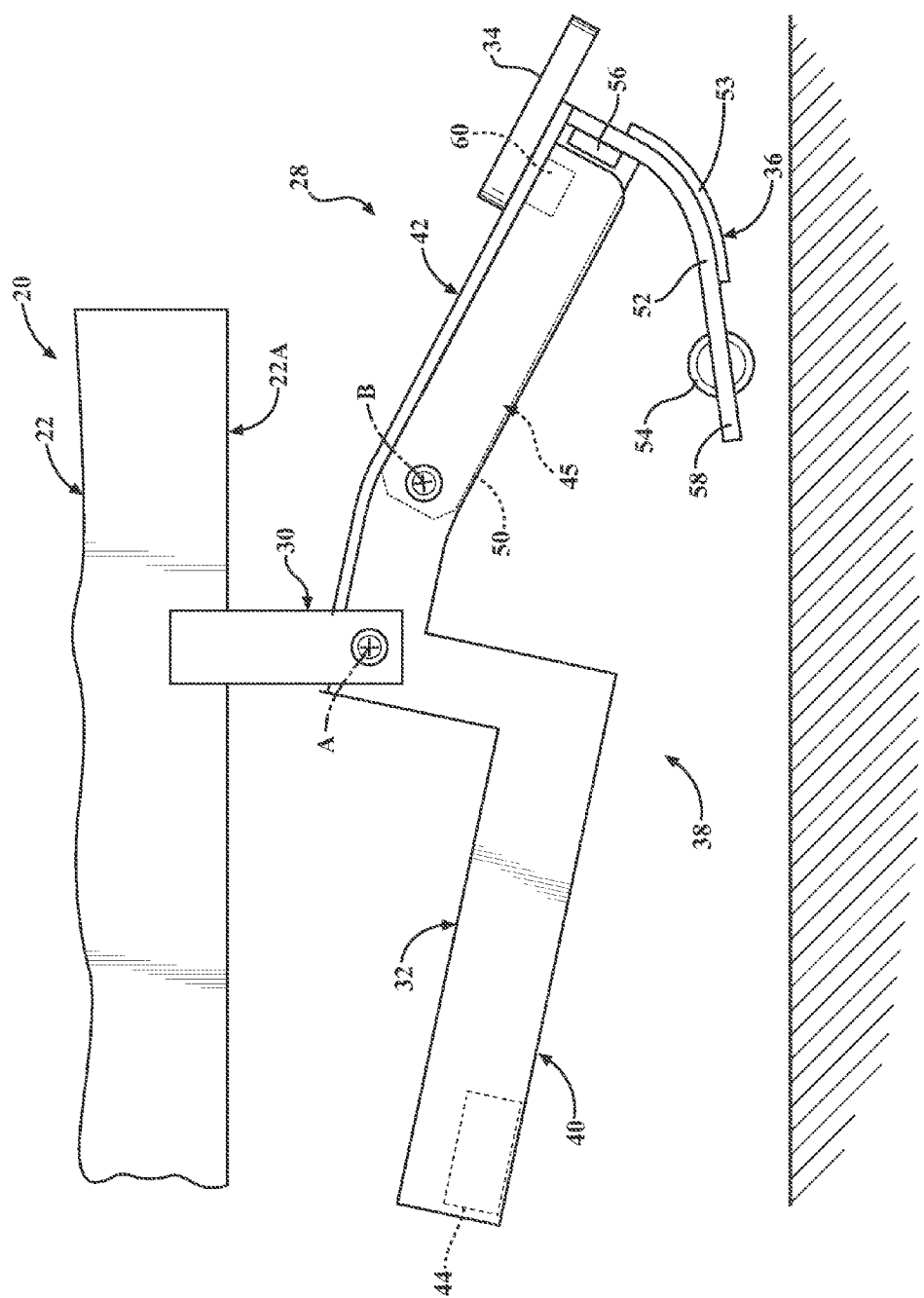
FIG. 2 is a schematic view of the start-assist pedal assembly in a home position.

With reference to FIG. 2, the start-assist pedal assembly 28 generally includes a mount 30, a support arm 32, a pedal 34, and an arched foot arm 36. The mount 30 is affixed to the body 22 and provides a pivot axis A about which the support arm 32 may pivot. The length of the mount 30 is determined by the height of the dolly 20 from the ground to the underside 22A.

The arched foot arm 36 is mounted to the support arm 32 at a pivot axis B such that the support arm 32 and the arched foot arm 36 pivot relatively in an essentially scissor-like manner. It should be appreciated that although the start-assist pedal assembly 28 in the disclosed non-limiting embodiment provides an initial start assist "push," the start-assist pedal assembly 28 may alternatively be configured to provide a "pull" force.

Figure 3:
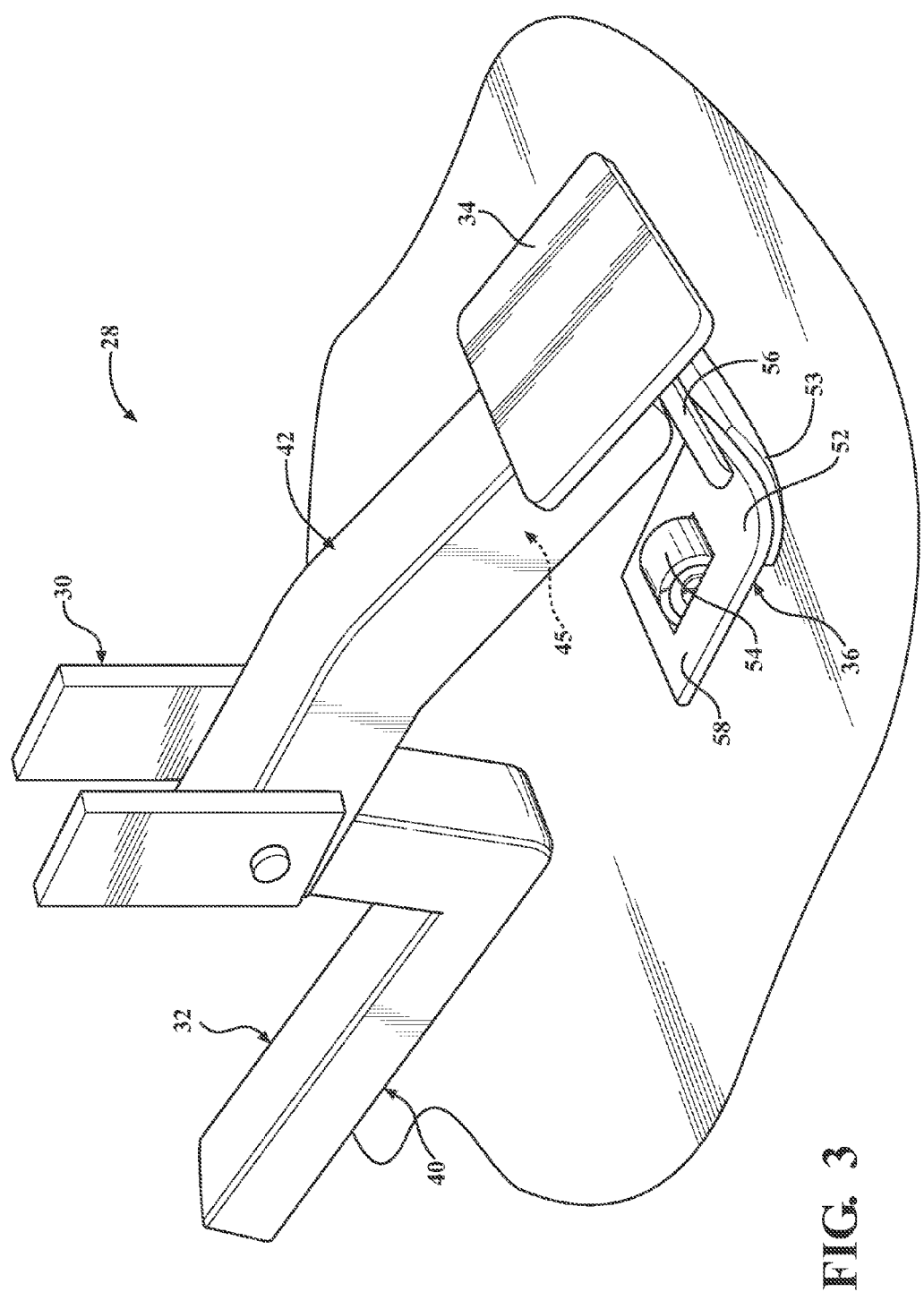
FIG. 3 is a perspective view of the start-assist pedal assembly in the home position.

The support arm 32 generally includes a first portion 40 on one side of the mount 30 and a second portion 42 on an opposite side of the mount 30. The first portion 40 is generally "L" shaped and may include a counterbalance weight 44 that offsets the weight opposite the pivot axis A. The second portion 42 may be an angled portion such that the foot pedal 34 is displaced from the underside 22A of the body 22 to provide foot access for an operator (FIG. 3). In one example, the support arm 32 in this disclosed non-limiting embodiment is manufactured of two inch square tubing that is ⅛ of an inch thick.

Figure 4:
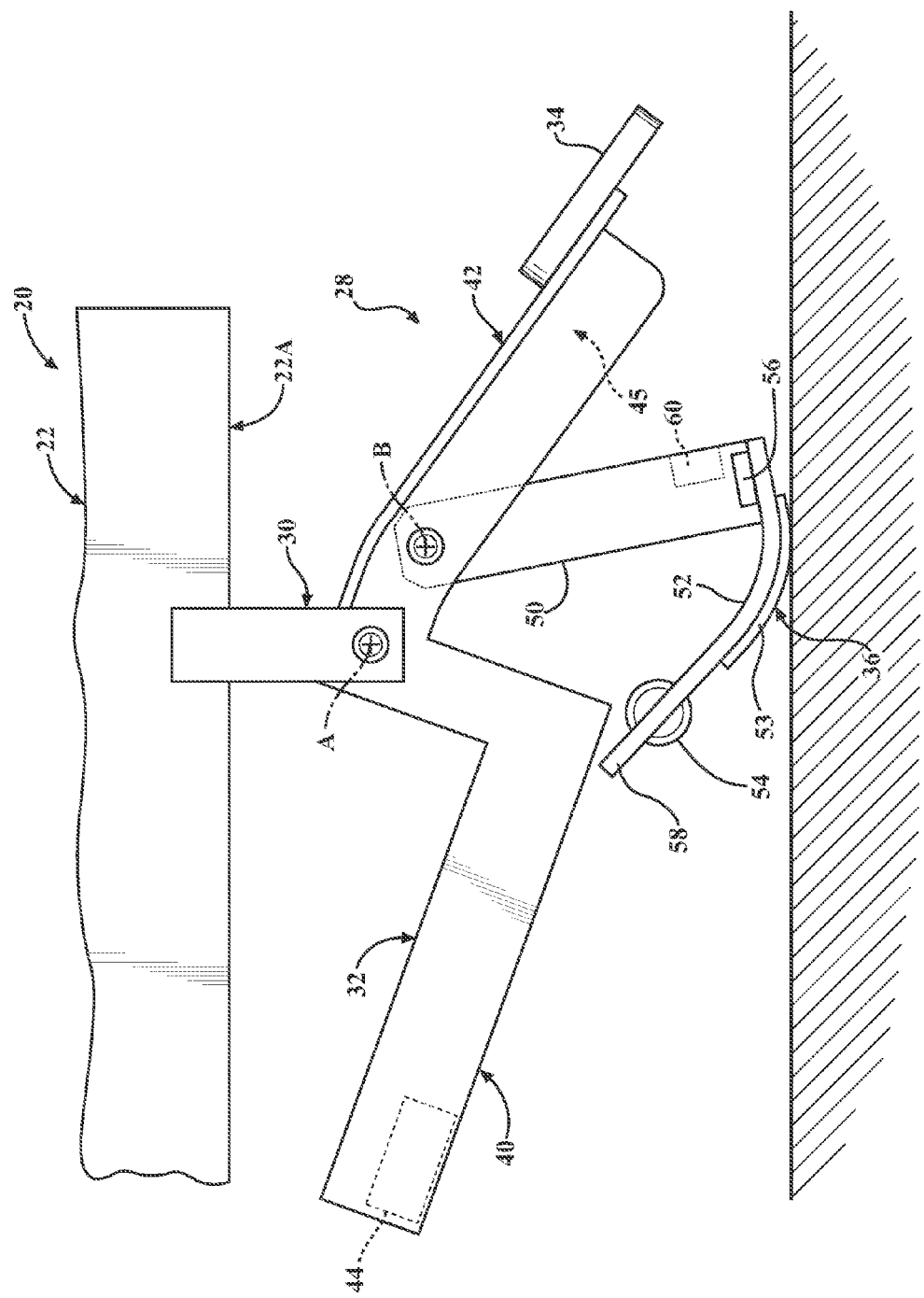
FIG. 4 is a schematic view of the start-assist pedal assembly in an operational position.
Figure 5:
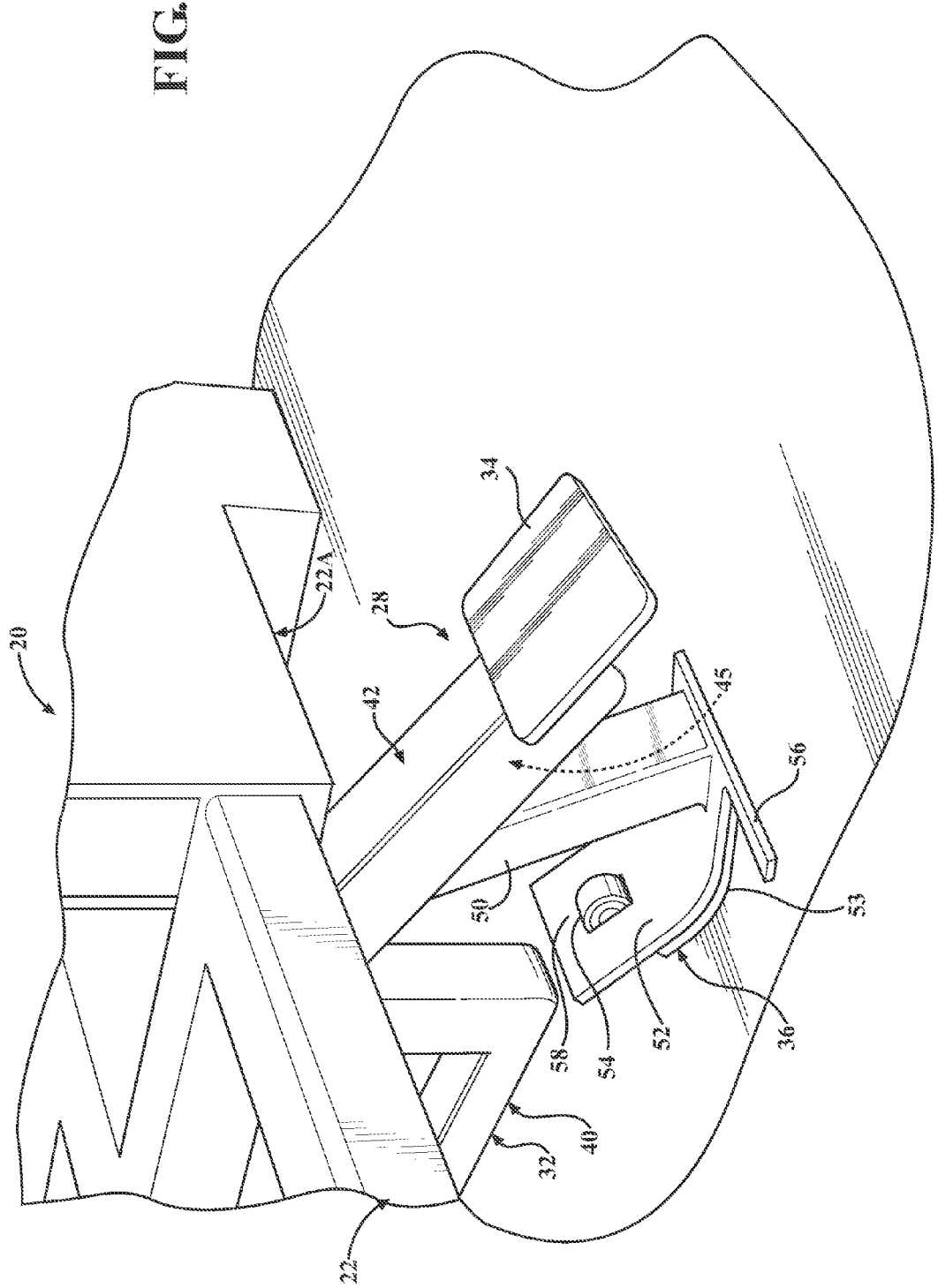
FIG. 5 is a perspective view of the start-assist pedal assembly in the operational position.

The arched foot arm 36 generally includes an arm 50, an arched footpad 52, a roller 54, and a kick post 56 (also shown in FIG. 4). The arm 50 in this disclosed non-limiting embodiment is manufactured of 1.5 inch square tubing that is ⅛ of an inch thick. The arched footpad 52 is affixed to the arm 50, and is of a relatively significant area to provide effective traction with the ground (FIG. 5). To facilitate traction, the arched foot arm 36 may include a traction pad 53 manufactured of a material such as rubber. The roller 54 is rotationally mounted within an end section 58 of the arched footpad 52 such that in a "home" position (shown in FIGS. 2 and 3), the roller 54 rolls along the ground or is displaced slightly therefrom such that minimal drag results from the start-assist pedal assembly 28. It should be appreciated that various rollers, wheels, and bearings will operate to provide a rolling interface.

The arm 50 is pivotally mounted to the support arm 32 at the pivot axis B such that the arm 50 may be at least partially received within the second portion 42 of the support arm 32 via a cutout area 45. The cutout area 45 essentially provides a three-sided portion of the square tubing in the second portion 42 such that the arched foot arm 36 is at least partially stored therein (FIGS. 2 and 3). The arm 50 may include a magnet 60 to retain the arched foot arm 36 in the stored position. An operator thereby need only tap the arched foot arm 36 with a toe to release the arched foot arm 36 from the magnetic retention (FIG. 6).

With reference to FIG. 3, the start-assist pedal assembly 28 stores the arched foot arm 36 at least partially within the support arm 32 through the retention of the magnet 60 such that the roller 54 rolls upon the ground. Due to the weight of the arched foot arm 36, the support arm 32 of the start-assist pedal assembly 28 is angled about pivot A such that the pedal 34 is readily accessible. That is, the first portion 40 of the support arm 32 is angled toward the underside of the body 22 (FIG. 2).

Figure 6:
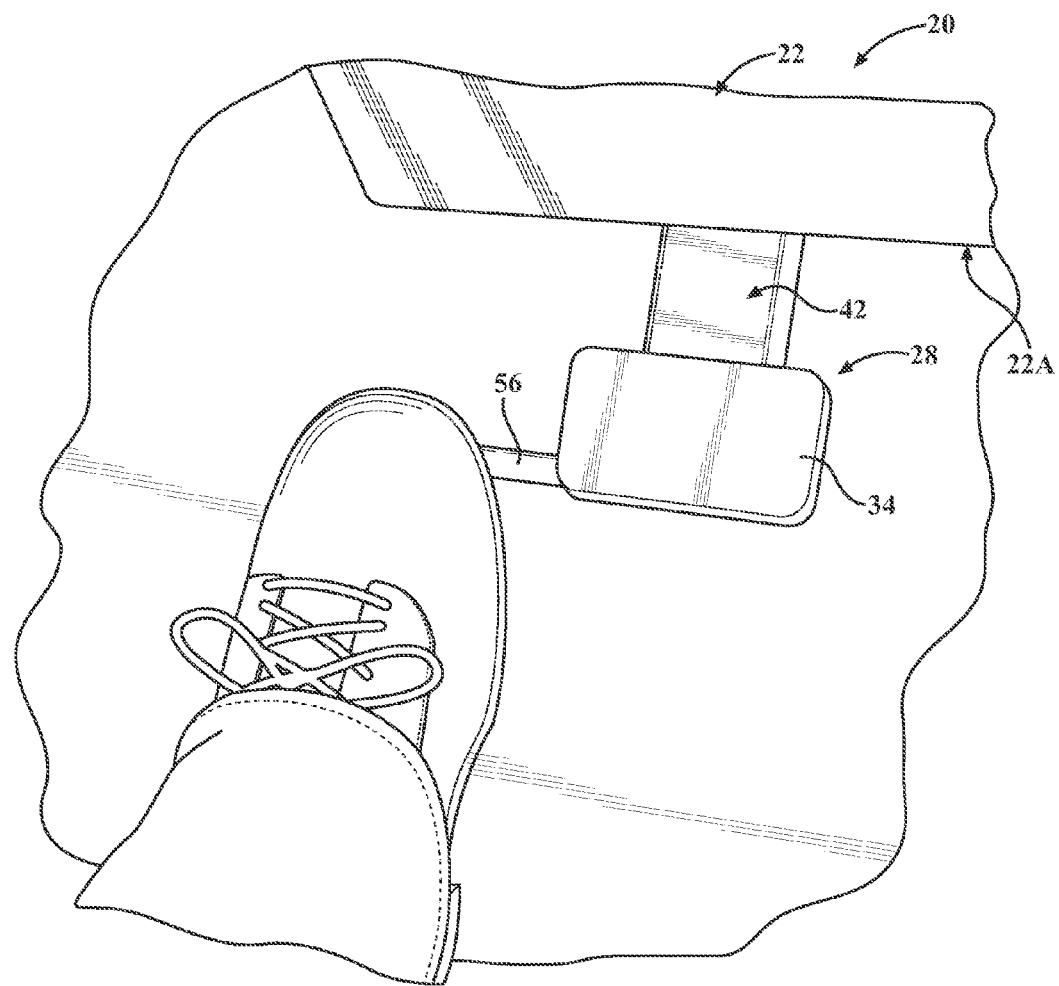
FIG. 6 is a perspective view of an operator releasing an arched foot arm of the start-assist pedal assembly.

With reference to FIG. 6, to initiate operation of the start-assist pedal assembly 28, a user releases the arched foot arm 36 by a tap to the kick post 56. The tap to the kick post 56, such as via a toe of a boot, releases the arched foot arm 36 from the magnet 60 such that the arched foot arm 36 drops from the support arm 32 and the arched footpad 52 contacts the ground (FIGS. 4 and 5).

Due to release of the arched foot arm 36, the support arm 32 of the start-assist pedal assembly 28 rotates about pivot A such that the first portion 40 of the support arm 32 is generally parallel to the underside of the body 22 and the arched footpad 52 contacts the ground with the roller 54 raised therefrom (FIGS. 4 and 5). The start-assist pedal assembly 28 is thus made ready for depression and push-assist of the dolly 20.

Figure 7:
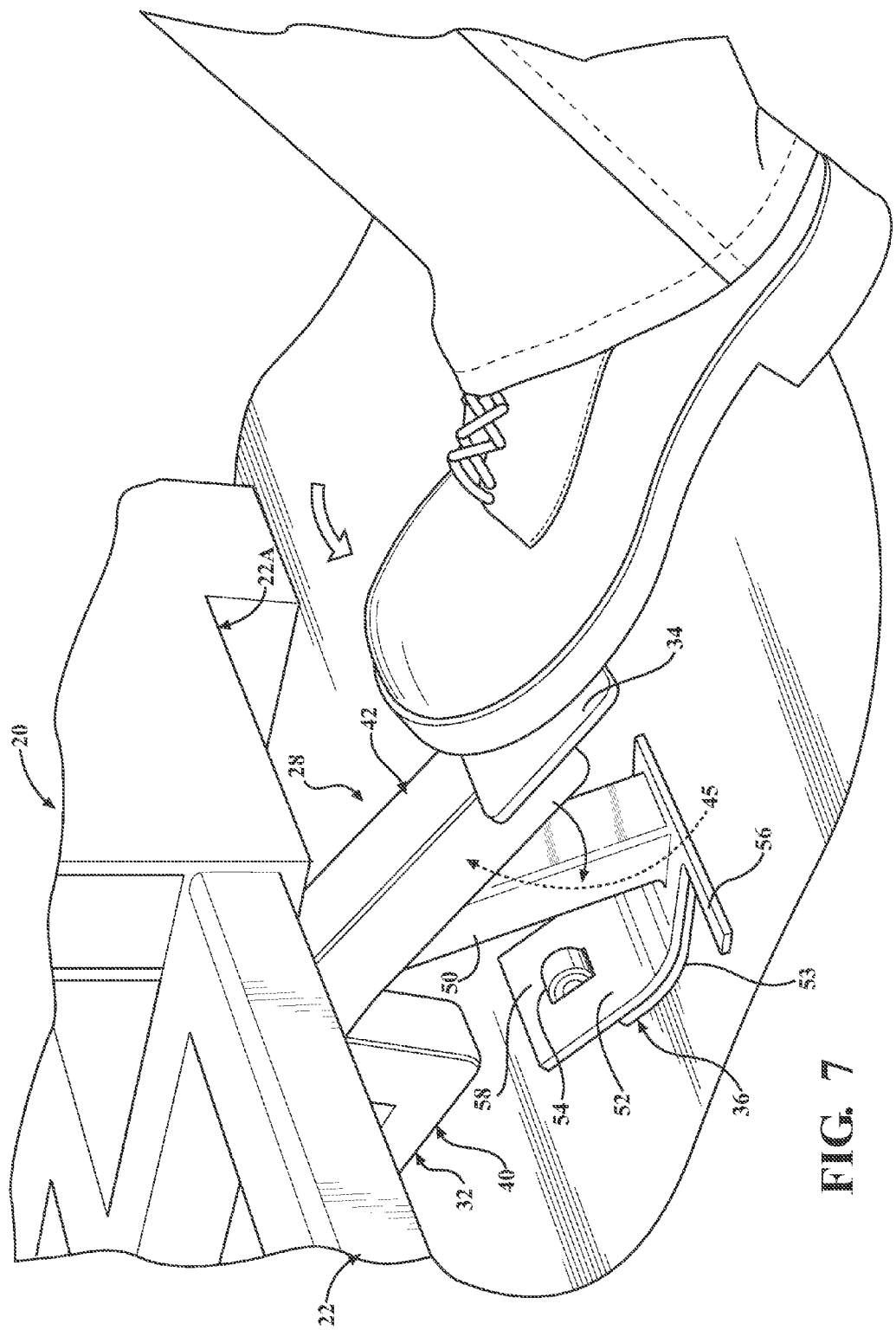
FIG. 7 is a perspective view of an operator actuating the start-assist pedal assembly.
Figure 8:
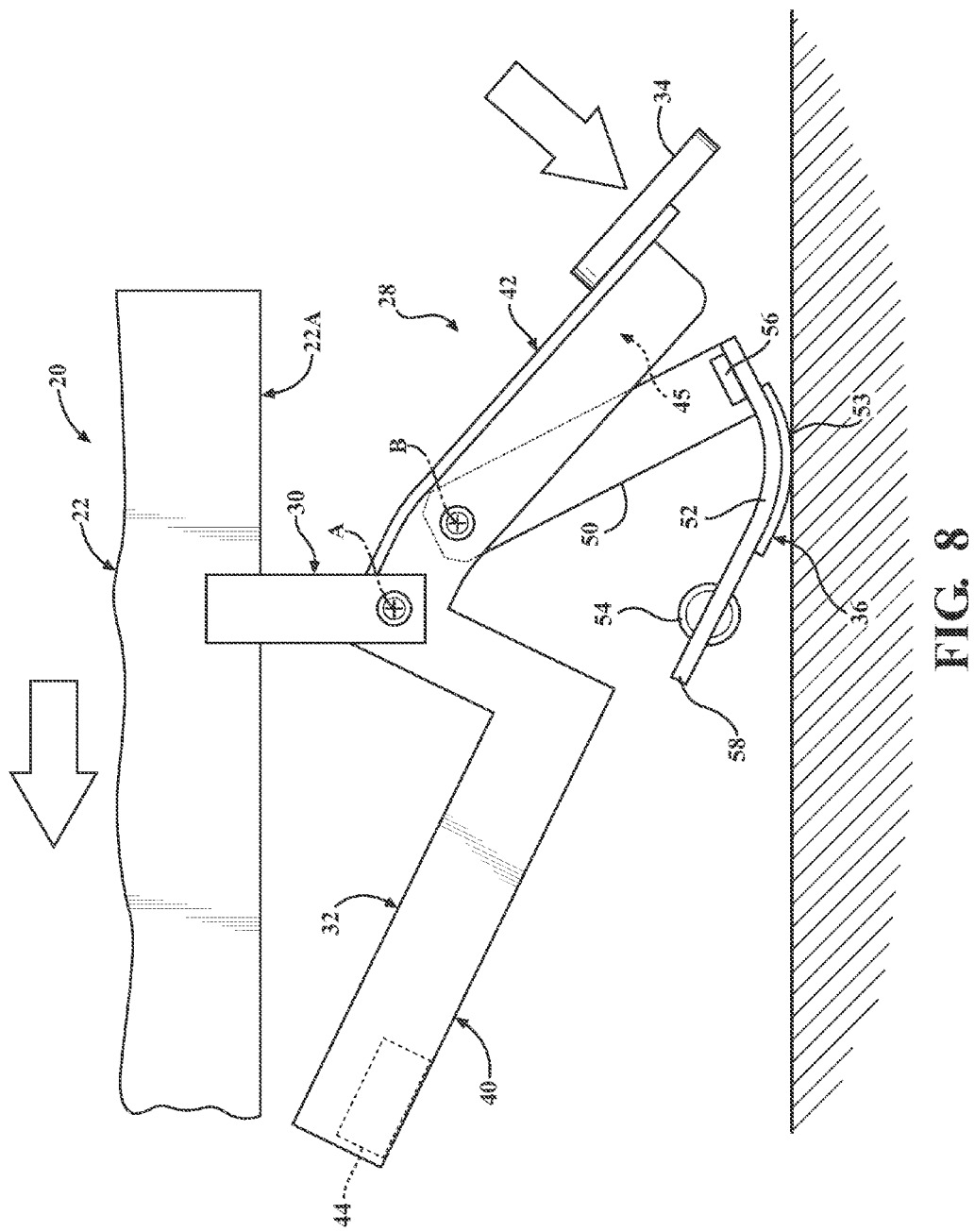
FIG. 8 is a schematic view of the start-assist pedal assembly in operation.

With reference to FIG. 7, to operate the start-assist pedal assembly 28 and provide push assist to the dolly 20, the user exerts a force upon the pedal 34 by stepping thereon. Application of force onto the pedal 34 generates a scissors action between the support arm 32 and the arched foot arm 36 to initiate movement of the dolly 20 as the arched footpad 52 reacts with the ground (FIG. 8). That is, the arched footpad 52 reacts with the ground to provide the push-assist to the dolly 20 through the support arm 32. As the arched footpad 52 rolls thru motion along the ground during the scissors action, the support arm 32 is driven toward the arched foot arm 36.

Figure 9:
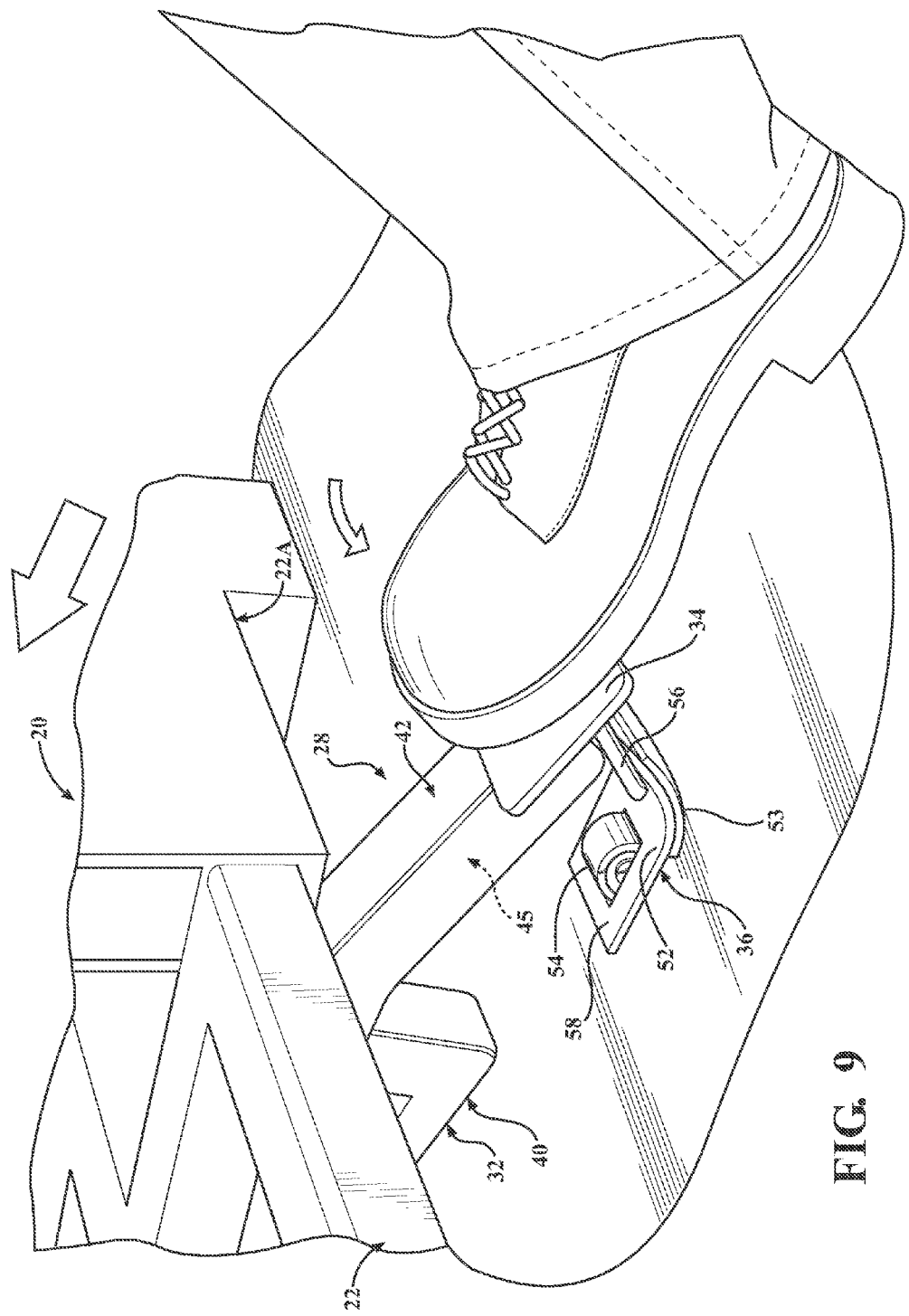
FIG. 9 is a perspective view of the start-assist pedal assembly in the home position subsequent to actuation.

With reference to FIG. 9, once the pedal 34 is fully depressed and the arched footpad 52 has reached full travel, the arched foot arm 36 is again magnetically retained to the support arm 32 via the magnet 60. The start-assist pedal assembly 28 is thus returned to the home position (FIGS. 2 and 3) and the roller 54 eliminates drag and allows continuous momentum of the dolly 20.

The start-assist pedal assembly 28 initiates movement of the dolly 20 and reduces the initial force required to start the dolly movement from a static position. The start-assist pedal assembly 28 reduces initial push force to 0 kg as compared to a standard of about 18.7 kg average or 15 kg ergonomic standard. Sustained push force of the dolly 20 remains at about 5 kg.

The use of the terms "a," "an," "the," and similar references in the context of the description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A start-assist pedal assembly for a dolly, comprising:
    a support arm;
    a pedal mounted to said support arm; and
    an arched foot arm pivotally attached to said support arm for a scissors action therewith, said arched foot arm including:
        an arched footpad, said arched footpad arching away from said support arm, and configured for reaction upon the ground with a roll thru motion with scissors action of said arched foot arm with said support arm, and
        a roller rotationally mounted within an end section of said arched footpad.

2. The assembly as recited in claim 1, further comprising a mount to which said support arm is pivotally attached.

3. The assembly as recited in claim 2, wherein said support arm includes a first portion that extends on one side of said mount, and a second portion that extends on the other side of said mount to which said pedal is mounted and said arched foot arm is pivotally attached.

4. The assembly as recited in claim 3, wherein said first portion is generally L shaped.

5. The assembly as recited in claim 3, further comprising a counterbalance weight mounted to said first portion.

6. The assembly as recited in claim 1, wherein said support arm is manufactured of square tubing.

7. The assembly as recited in claim 1, further comprising a magnet mounted to said arched foot arm to retain said arched foot arm to said support arm in a home position.

8. The assembly as recited in claim 7, wherein said arched foot arm is at least partially received into said support arm in said home position.

9. The assembly as recited in claim 8, wherein said roller rolls upon the ground in said home position.

10. The assembly as recited in claim 7, further comprising a kick post that extends from said arched foot arm.

11. A dolly, comprising:
 a body;
 a multiple of casters mounted to said body;
 a support arm pivotally mounted to said body;
 a pedal mounted to said support arm; and
 an arched foot arm pivotally attached to said support arm for scissors action therewith, said arched foot arm including:
  an arched footpad, said arched footpad arching away from said support arm, and configured for reaction upon the ground with a roll thru motion with scissors action of said arched foot arm with said support arm, and
  a roller rotationally mounted within an end section of said arched footpad.

12. The dolly as recited in claim 11, further comprising a handle mounted to said body, said pedal located on a side of said body common to said handle.

13. The dolly as recited in claim 11, wherein a force applied to said pedal generates scissors action of said arched foot arm with said support arm, and is translated into a push force upon said body as said arched footpad reacts upon the ground.

14. The dolly as recited in claim 13, wherein said arched foot arm is magnetically retained to said support arm upon full depression of said pedal.

15. The dolly as recited in claim 14, wherein said roller rolls upon the ground upon full depression of said pedal.

* * * * *